United States Patent [19]

Ross

[11] 4,065,147
[45] Dec. 27, 1977

[54] SYSTEM FOR ALIGNING TRAILER HITCHES

[76] Inventor: John E. Ross, 1540 Casa Rio Drive, Orlando, Fla. 32807

[21] Appl. No.: 691,370

[22] Filed: June 1, 1976

[51] Int. Cl.² .............................................. B60D 1/16
[52] U.S. Cl. .................................................... 280/477
[58] Field of Search .................. 280/477; 33/264, 286; 116/28 R

[56] References Cited

U.S. PATENT DOCUMENTS

| 2,854,942 | 10/1958 | Ross | 116/28 R |
| 3,159,917 | 12/1964 | Whitehead | 280/477 |
| 3,670,423 | 6/1972 | Leber | 33/286 |

*Primary Examiner*—Richard A. Bertsch
*Assistant Examiner*—R. Schrecengost
*Attorney, Agent, or Firm*—Duckworth, Hobby & Allen

[57] ABSTRACT

A system for aligning a leading vehicle with the vehicle to be trailed, the leading vehicle being of the type having a rearward window facing the trailing vehicle and a rear hitch for attaching a tongue of the trailing vehicle thereto. The system includes an indicating mark on the rearward window, and a rod mounted on the tongue of the trailing vehicle, the rod telescoping in both the vertical and horizontal directions such that the dimension of the rod may be adjusted so that the extremity of the rod comes into contact with the rearward window immediately adjacent the indicating means when the hitch of the leading vehicle is in alignment with the tongue of the trailing vehicle.

3 Claims, 2 Drawing Figures

SYSTEM FOR ALIGNING TRAILER HITCHES

BACKGROUND OF THE INVENTION

1. Field of the Invention

The present invention relates to articulated vehicles, and in particular relates to devices and systems for aligning a leading vehicle with a trailing vehicle during a hitching operation.

2. Description of the Prior Art

A number of prior art hitch guides have been devised. For example, in U.S. Pat. No. 3,774,149, Bennett discloses an arrangement utilizing two vertical rods, one mounted on the hitch of the leading vehicle and the other mounted on the tongue of the trailing vehicle such that when the hitch and tongue are brought together the rods interconnect to illuminate a light at the extremity of one of the rods. A somewhat similar arrangement for illuminating a light is disclosed in U.S. Pat. No. 3,901,536 to Black, in which the patentee also discloses a rod-like arrangement which is mounted on the trunk deck of the leading vehicle, this trunk-mounted rod adapted to engage apparatus extending in a vertical direction from the trailer tongue.

Another arrangement is disclosed by Voelkerding et al in U.S. Pat. No. 3,765,703. The arrangement disclosed by Voelkerding et al also employs two vertically extending rods, one mounted on the hitch of the leading vehicle and the other mounted on the tongue of the trailing vehicle. Each vertical rod includes a ball mounted on the upper extremity thereof and above the level of the trunk deck of the leading vehicle, so that the driver can observe the coming together of the two balls for alignment purposes. A somewhat similar arrangement is disclosed by Lehtisaari in U.S. Pat. No. 3,918,746, this arrangement also including two vertically mounted rods one of which is coupled to the leading vehicle hitch and the other to the tongue of the trailing vehicle. Each of the vertically extending rods is provided with means for allowing that rod to be telescoped up and down in a vertical plane.

All of the arrangements disclosed above require the mounting of hardware on either the truck deck or the hitch of the leading vehicle. However, the constant installation and removal of such arrangements after each trailer hook-up is unduly burdensome and time consuming.

Other prior art arrangements similar to that described above are shown in United States Patent and Trademark Office Class 280, Subclass 477, among others.

SUMMARY OF THE INVENTION

The present invention contemplates a system for aligning a leading vehicle with a vehicle to be trailed, wherein the leading vehicle is of the type having a rearward window in a direction facing the trailing vehicle, the system including indicating means on said rearward window of the leading vehicle and a rod mounted on the trailing vehicle, the rod dimensioned such that the extremity thereof contacts the window immediately adjacent the indicating means on the rearward window of the leading vehicle when proper alignment of the leading vehicle with the trailing vehicle has been effected.

In a preferred embodiment, the rod mounted on the trailing vehicle has means for allowing the rod to be telescoped in both the vertical and horizontal directions, so that appropriate adjustments can be made for changes in the dimension between the trailing vehicle and the rearward window of different types of leading vehicles.

THE DRAWING

DETAILED DESCRIPTION

A first embodiment in accordance with the present invention will now be described with reference to FIG. 1.

Figure 1:
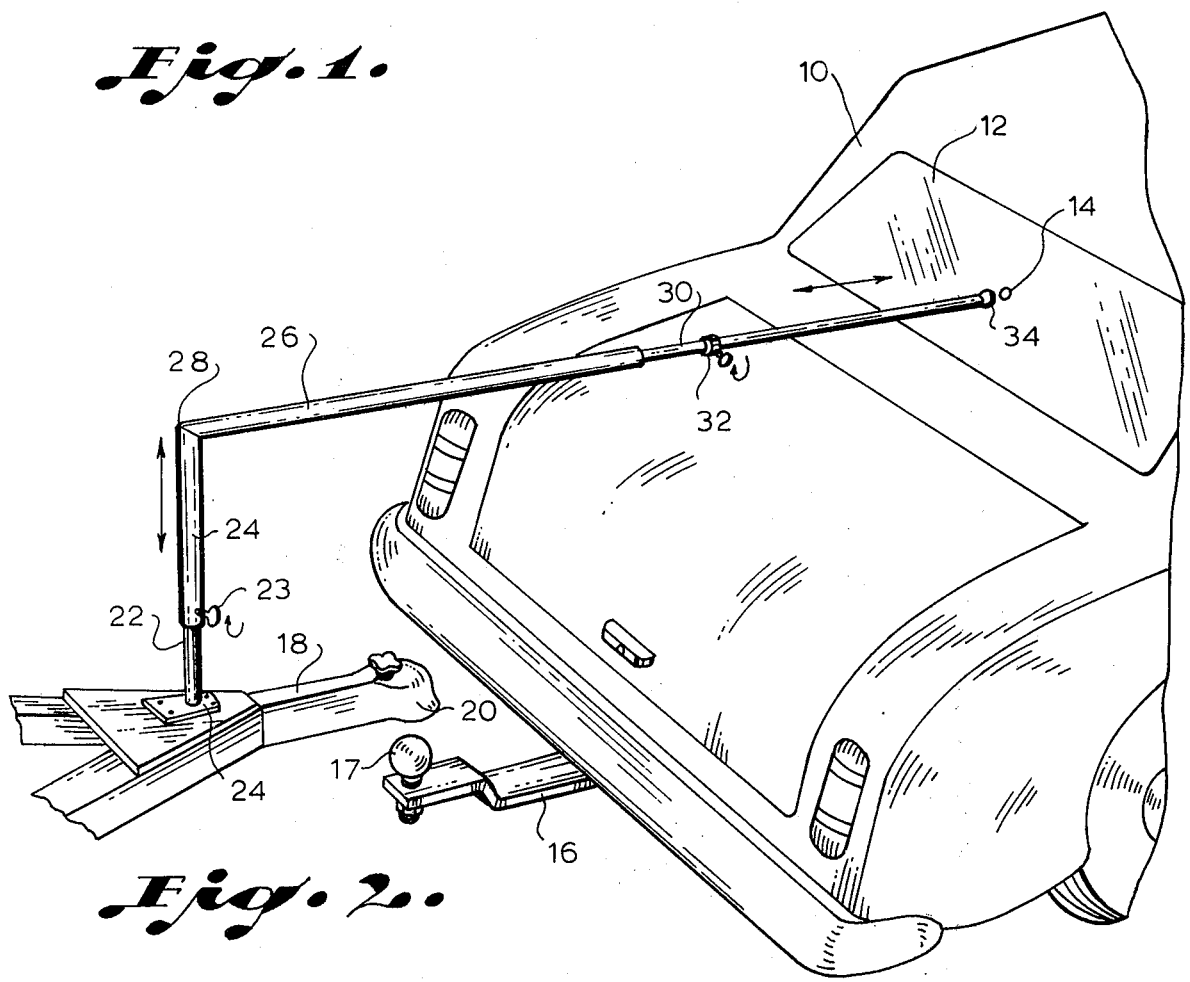
FIG. 1 is a perspective view of an automobile and trailing vehicle combination utilizing the alignment system of the present invention, in which a portion of the automobile and trailing vehicle are cut away.

As shown in FIG. 1, the system of the present invention is contemplated for use with a leading vehicle, such as an automobile 10, of the type having a rear window 12. The rear window is provided with a centrally located indicator mark 14, which may comprise a piece of masking tape or the like cut into a small diameter circle and applied to the inside of the window 12. Alternatively, the indicator mark 14 may be painted or otherwise applied to the window 12. The vehicle 10 is also provided with a rearward-facing hitch 16 of conventional design, including a ball 17 which is adapted to receive a socket 20 of a trailer hitch, in a conventional manner.

A trailing vehicle, such as a boat trailer, as contemplated for use with the system of the present invention includes a trailer tongue 18 having the ball socket 20 at the extremity thereof. The system of the present invention is particularly useful for those types of trailers that are of sufficient weight to cause difficulty in engaging the ball socket 20 with the ball 17 unless the ball is positioned immediately underneath the socket 20.

In accordance with the present invention, there is provided a vertically extending rod 22 which is mounted to a base plate 24 attached to the tongue 18 of the trailing vehicle. A tubular member 24 fits over the rod 22 in a sliding engagement, and is moved to an adjustable position and locked in place by a thumb screw 23 or similar mechanism, thus allowing the overall combination of the rod 22 and the tubular member 24 to obtain a vertical adjustment. Likewise, the system of the present invention is provided with a second tubular member 26 and a second rod 30 which fits in sliding engagement with the second tubular member 26, the two tubes 24, 26 being welded or otherwise joined together at a ninety degree angle 28. A clamping sleeve 32 mounted on the second rod 30 acts as a limiter of movement of the rod 30 into the tubular member 26. It will thus be understood that the alignment device of the present invention may be adjusted in both the vertical and horizontal directions, as is indicated by the vertical arrows shown adjacent the vertically extending tubular member 24 and the horizontal arrows adjacent the rod 30.

A cushioning member 34 is attached to the extremity of the rod 30. This may comprise a cork member, or a rubber ball.

In use, the vertical and horizontal rods 22 and 30 are adjusted so as to allow the upper rod 30 to extend across the trunk deck of the automobile 10 such that the cushioning member 34 comes in contact with the indicator mark 40 when the ball 17 is immediately underneath the ball socket 20. In such an arrangement, it is desirable that the upper tubular member 26 be substantially parallel with the end portion of the trailer tongue 18. After appropriate vertical and horizontal adjustments have been made to this end, subsequent alignment operations are facilitated by simply backing the automobile in a straight line toward the trailer tongue 18, until such time as the cushioning member 34 rests immediately adjacent the indicator mark 14. At such time, appropriate alignment between the ball 17 and the ball socket 20 is made, and the trailer tongue 18 may then be lowered so as to effect appropriate engagement for further trailering operations.

Figure 2:
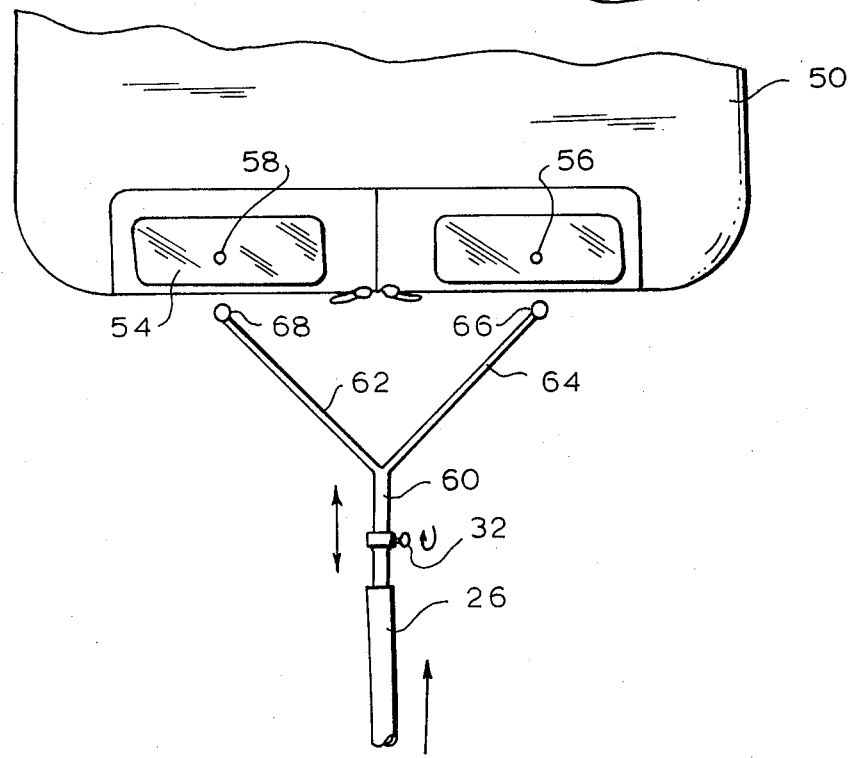
FIG. 2 is a top plan view of a second embodiment of the system of the present invention, illustrating a portion of a van-type leading vehicle and the alignment mechanism of the alternate embodiment.

A second embodiment of the system of the present invention is shown in FIG. 2. The vehicle of FIG. 2, which is partially cut away, is of van-type having two rear doors each of which includes a rear window 52, 54. In order to accomodate this type of an arrangement, two indicator marks 56, 58 are applied to the respective windows 52, 54 and the horizontal rod 60 of the alignment device includes a "Y" arrangement having two arms 62, 64 each of which includes a cushioned member 66, 68 at the extremity thereof. In use, the vehicle 50 is backed toward the trailing vehicle until such time as the cushioning member 66, 68 come in contact with the respective window 52, 54 immediately adjacent the corresponding one of the indicator marks 56, 58.

An alignment arrangement in accordance with the present invention avoids the requirement of mounting hardware on either the leading vehicle or the hitch associated with the leading vehicle, thus avoiding the burdensome requirements of mounting and dismounting this equipment.

I claim:

1. A system for aligning a leading vehicle with a vehicle to be trailed, wherein said leading vehicle is of the type having two rearward windows in a direction facing said trailing vehicle, said system comprising:
  a mark on each of said rearward windows of said leading vehicle;
  means for changing the dimension of said rod in a first direction toward said leading vehicle;
  means for changing the dimension of said rod in a second direction substantially transverse to said first direction;
  a rod mounted on said trailing vehicle, said rod dimensioned such that the extremity thereof contacts said window immediately adjacent said indicating means on said rearward window of said leading vehicle when proper alignment of said leading vehicle with said trailing vehicle has been effected; and wherein
  said rod includes two arms at said extremity with each arm adapted to contact one of said windows at the corresponding mark on said windows.

2. The system recited in claim 1 wherein said rod includes a pliable member mounted on said extremity.

3. A system for aligning a leading vehicle with a vehicle to be trailed, wherein said leading vehicle is a sedan automobile of the type having a flat trunk deck and having a rearward window over said trunk deck and facing said trailing vehicle, and a rear hitch for attaching said trailing vehicle thereto, and wherein said trailing vehicle is of the type having a hitch-engaging tongue at the forward end thereof, said system comprising:
  a mark on said rearward window of said leading vehicle;
  a rod mounted on said tongue of said trailing vehicle;
  a pliable member mounted on one end of said rod;
  means for changing the dimension of said rod in a first direction toward said leading vehicle;
  means for changing the dimension of said rod in a second direction substantially normal to said first direction; and wherein
  said rod is dimensioned so as to extend over said trunk deck and said first and second direction dimension changing means are adjusted such that said pliable member comes into contact with said rearward window at said mark on said rearward window when said hitch is in a position of alignment with said trailing vehicle tongue.

* * * * *